United States Patent [19]
Thompson, Jr.

[11] 4,046,394
[45] Sept. 6, 1977

[54] SHOPPING CART

[75] Inventor: William A. Thompson, Jr., Toms River, N.J.

[73] Assignee: Roblin Industries, Inc., Battle Creek, Mich.

[21] Appl. No.: 619,298

[22] Filed: Oct. 3, 1975

[51] Int. Cl.² .............................................. B67B 3/02
[52] U.S. Cl. ...................... 280/33.99 B; 280/DIG. 4; 280/33.99 R
[58] Field of Search ................. 280/33.99 R, 33.99 H, 280/33.99 S, 33.99 F, 33.99 B, 33.99 T, 36 B, 47.34, 47.35, 647, DIG. 4; 296/31 P

[56] References Cited
U.S. PATENT DOCUMENTS

| | | | |
|---|---|---|---|
| 3,012,796 | 12/1961 | Mieding | 280/204 |
| 3,109,667 | 11/1963 | Wolner | 280/87.02 |
| 3,205,976 | 9/1965 | Stollman | 186/1 |
| 3,318,612 | 5/1967 | Kuhn | 280/79.2 |
| 3,346,271 | 10/1967 | Parsons | 280/33.99 |
| 3,442,406 | 5/1969 | Lowe | 280/33.99 |
| 3,536,283 | 10/1970 | Lowe | 280/33.99 H |
| 3,536,336 | 10/1970 | Palmer | 280/47.34 |
| 3,549,165 | 12/1970 | Zuhlke | 296/31 P |
| 3,614,133 | 10/1971 | Ganci | 280/33.99 R |
| 3,999,774 | 12/1976 | Rehrig | 280/33.99 R |

OTHER PUBLICATIONS

"Tuff Stuff" Shoppin' Basket, Sears Catalogue, Christmas 1974, copyright 1974, p. 480.

Primary Examiner—Joseph F. Peters, Jr.
Assistant Examiner—David M. Mitchell
Attorney, Agent, or Firm—Blanchard, Flynn, Thiel, Boutell & Tanis

[57] ABSTRACT

A shopping cart having a basket mounted on a wheeled base. The basket comprises a main body member which is molded in one piece from plastics material and defines the bottom, front and side walls of the basket. A one-piece gate molded of plastics material is hingedly mounted on the body member and comprises the rear wall of the basket. The gate includes an integral handle which extends between and is rotatably supported on the side walls for both hingedly mounting the gate and for structurally connecting the side walls together. A collapsible baby seat assembly, which is preferably formed of plastics material in a single molding operation, is hingedly and slidably supported on the gate for movement between collapsed and non-collapsed positions. The base is also formed by a one-piece frame which is molded from plastics material, which frame has wheels mounted thereon for rolling engagement with a support surface. The frame and body member have a cooperating tongue-and-groove connection for fixedly mounting the basket onto the base.

19 Claims, 13 Drawing Figures

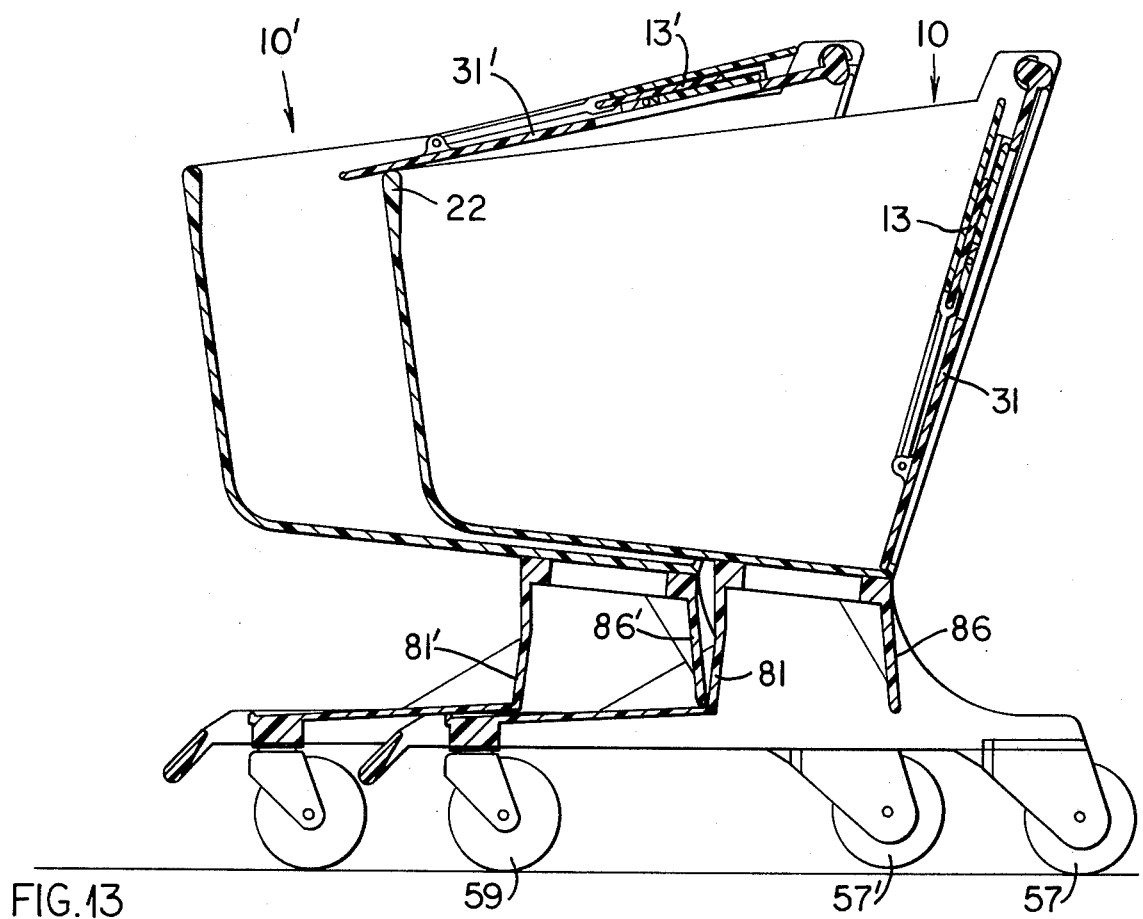
FIG. 13
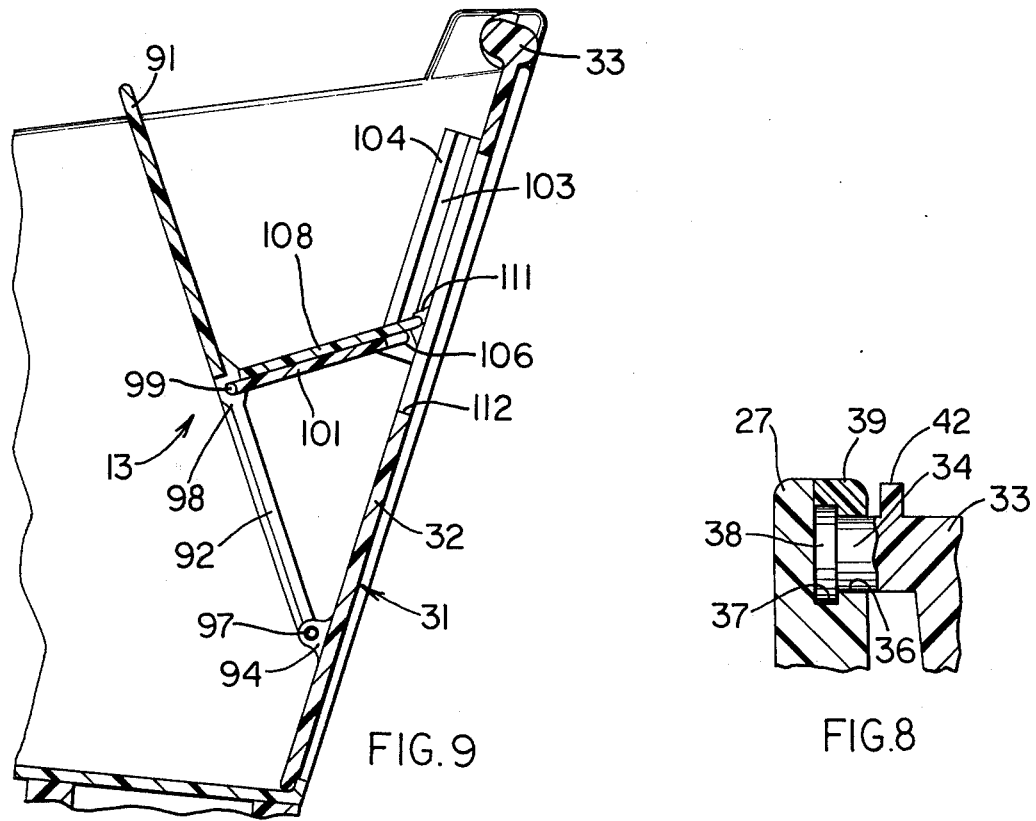
FIG. 9
FIG. 8

SHOPPING CART

FIELD OF THE INVENTION

This invention relates to a shopping cart and, in particular, to an improved cart wherein the basket, except for the swingable rear gate and the collapsible baby seat assembly, is formed by a one-piece plastics member, and wherein the basket is fixedly mounted on a wheeled base which is also formed as a one-piece plastics member.

BACKGROUND OF THE INVENTION

Shopping carts employing a basket mounted on a wheeled base are utilized extensively in supermarkets, department stores and the like. Due to increased population, and the accompanying growth in shopping centers and the substantial increase in the number of self-serve supermarkets and department stores, there has been a continuing increase in the demand for shopping carts. At the present time, and for several years past, substantially all of the high quality shopping carts are and were constructed of metal, specifically a plurality of wire and tubular members and joint fittings which must be individually fabricated and then individually assembled to form the cart. This latter process includes assembling the joint fittings and the wire and tubular members in a jig, spot or arc welding and/or brazing the wire or tubular members in the joints, cleaning and grinding the arc welds to form smooth junctions, priming the assembled cart to prevent rust, and finally plating the cart. Since this process is obviously slow and requires substantial labor, this severely restricts the production rate and results in the shopping cart being relatively expensive.

A further disadvantage of a metal shopping cart in addition to cost, is that it is relatively heavy which thus impairs the mobility of the cart. More specifically, a heavy metal cart is more difficult to push, and thus use of such cart is more objectionable to the customer. In addition, when a plurality of such carts are nested together, the movement of the nested carts is difficult in view of the substantial weight.

Another disadvantage which arises due to the conventional practice of taking shopping carts outside the supermarket, such as into a parking lot, is that metal carts, even though plated, are more or less susceptible to rusting when exposed to rain, snow, ice and the like. This problem of rusting is particularly severe after the carts have been in use for a period of time so that the plating becomes cracked or scratched. When the cart begins to rust, it creates a very unfavorable impression on the customer, so that such cart can no longer be satisfactorily utilized. Due to the expense of metal carts, the replacement thereof due to rusting or other damage has constituted a substantially large and recurring business expense.

Metal carts, when left in parking lots, also often cause substantial damage to automobiles.

The wire mesh structure of a conventional metal shopping cart also makes cleaning of the cart difficult. Since a great majority of shopping carts are used in supermarkets for the handling of food products, customer acceptance of the carts requires that they be maintained clean. The known metal carts have necessarily required that they be cleaned rather frequently, normally by use of a high velocity steam or hot water spray. The difficulty of cleaning these metal carts, and the frequency with which the cleaning must be performed, substantially increases the cost associated with owning and maintaining such carts.

Other disadvantages associated with metal shopping carts relate to the noise created by these carts, and the difficulties encountered in separating the nested carts. In view of the large number of wires and tubular members which are assembled to manufacture the carts, and in view of the welding and other assembly techniques used for forming the cart, the manufacture of metal shopping carts with precise tolerances is substantially impossible. Because of the substantial so-resulting dimensional variations in the carts, the carts often have a tendency to wedge together when nested.

Accordingly, while metal shopping carts have been made and effectively used in very large numbers for several years and much effort has gone into maximizing their efficiency and durability, there is still substantial and recognized room for improvement, Thus, it is an object of the present invention to provide an improved shopping cart which overcomes the above-mentioned disadvantages, said improved shopping cart being constructed substantially entirely of plastics material. More specifically, it is an object of the present invention to provide:

1. A shopping cart, as aforesaid, which includes a basket mounted on a wheeled base, with the basket and base each being capable of comprising primarily a one-piece plastics member.

2. A shopping cart, as aforesaid, wherein the basket is capable of comprising a one-piece molded plastics member which defines the front, bottom and side walls of the basket.

3. A shopping cart, as aforesaid, wherein the base is also formed as a one-piece molded plastics member and includes a substantially U-shaped frame on which the wheels are mounted, and a pedestal integrally fixed to and projecting upwardly from the frame for attachment to the basket.

4. A shopping cart, as aforesaid, wherein the basket and pedestal have cooperating flanges and grooves formed thereon for permitting the basket to be easily and efficiently mounted on the base while resulting in a secure and strong connection therebetween, and for maintaining the desired alignment of the basket relative to the base.

5. A shopping cart, as aforesaid, which utilizes a one-piece plastics gate hingedly mounted on the one-piece basket member for closing the rear end of the basket, which gate additionally includes handle means integrally attached to the upper edge thereof and pivotally supported on the opposite side walls of the basket.

6. A shopping cart, as aforesaid, including a collapsible baby seat assembly mounted on the rear gate, which seat assembly is formed of plastics material by a single molding operation.

7. A shopping cart, as aforesaid, which can readily nest with a further such cart.

8. A shopping cart, as aforesaid, wherein the base includes a support platform on the forward end thereof, which support platform slopes downwardly at a slight angle so as to function both as a platform for supporting objects thereon, and as a camming surface for engagement with a lifting plate positioned on the rear side of the pedestal when a plurality of said carts are nested together so that the rear wheels of the nested cart will be lifted out of engagement with the ground.

9. A shopping cart, as aforesaid, which is capable of being formed almost wholly from molded plastics material and possesses a minimum number of molded parts to permit the cart to be rapidly and efficiently manufactured at relatively low cost.

10. A shopping cart, as aforesaid, which is substantially lighter in weight than a conventional metal cart, which creates an overall impression which is highly pleasing, and which is of an aesthetically balanced symmetrical form.

11. A shopping cart, as aforesaid, which eliminates the time-consuming manufacturing techniques necessarily used for making metal carts, such as by eliminating the need to handle, fabricate and join metal wires and tubes, which eliminates the need to braze or weld metal components, and accordingly eliminates the disadvantages which exist in the manufacturing processes of the prior carts.

12. A shopping cart, as aforesaid, wherein the component parts of the cart are adaptable for molding from a tough, resilient resin using a technique which produces a hard exterior shell and a structural foam interior, thereby minimizing the moment of inertia per unit mass and per unit length of the components while at the same time providing maximum durability and minimum weight.

13. A shopping cart, as aforesaid, which can be manufactured with a high degree of dimensional stability since the cart is formed from a small number of molded components, so that the cart can be efficiently manufactured and assembled at relatively low cost and at a rapid rate while permitting a degree of dimensional uniformity not possible with known metal carts.

14. A shopping cart, as aforesaid, which is immune to rust and does not require priming and plating, and can thus be readily left outdoors without suffering damage or deterioration.

15. A shopping cart, as aforesaid, which when left in parking lots is less susceptible to being damaged by vehicles and in turn is less susceptible of damaging vehicles.

16. A shopping cart, as aforesaid, which because of its molded plastic structure and specifically its plastic base, possesses greater durability, and particularly deformation resistance, so as to be able to withstand impacts without causing damage to either the cart or other objects.

17. A shopping cart, as aforesaid, which is extremely simple to keep clean, which can be provided in decorative and distinctive colors, and which can be easily imprinted with identifying information at the time of molding if desired.

Other objects and purposes of the present invention will be apparent to persons familiar with carts of this general type upon reading the following specification and inspecting the accompanying drawings.

BRIEF DESCRIPTION OF THE DRAWINGS

FIG. 8 is a fragmentary sectional view taken along the line VIII—VIII in FIG. 7.

FIG. 9 is an enlarged, fragmentary sectional view of the baby seat assembly in an open position.

FIG. 13 is a side sectional view showing a plurality of carts in a nested condition.

Figure 1:
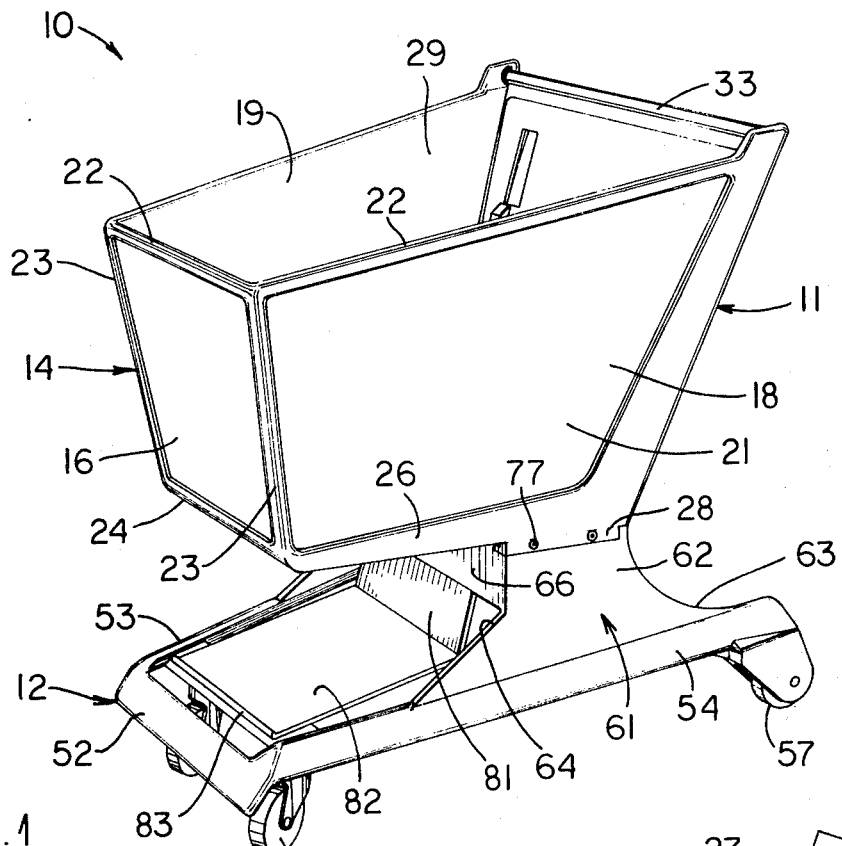
FIG. 1 is a perspective view of a shopping cart according to the present invention.

Certain terminology will be used in the following description for convenience in reference only and will not be limiting. For example, the words "upwardly", "downwardly", "rightwardly" and "leftwardly" will refer to directions in the drawings to which reference is made. The words "inwardly" and "outwardly" will refer to directions toward and away from the geometric center of the cart and designated parts thereof. The words "forward" and "rearward" will refer respectively to the leftward and rightward ends of the cart as appearing in FIGS. 1 and 2. Said terminology will include the words above specifically mentioned, derivatives thereof and words of similar import.

SUMMARY OF THE INVENTION

The objects and purposes of the present invention, including those set forth above, have been met by providing a shopping cart having a basket assembly mounted on a wheeled base assembly. The basket assembly is formed by a one-piece plastics basket member which defines the front, bottom and side walls of the basket. A one-piece plastics gate, having an integral handle portion, is swingably mounted on the basket for closing the rearward end thereof. The handle portion extends between and is rotatably supported on the upper rear corners of the side walls to structurally connect same together while additionally permitting the gate to be swung upwardly when plural carts are nested. A collapsible baby seat assembly, also of a plastics construction, is mounted on the rear gate. The base assembly comprises a one-piece plastics base having wheels and/or casters mounted thereon. The one-piece base includes an upwardly projecting pedestal which is connected to the basket. A tongue-and-groove connection is provided between the basket and the pedestal. This latter-mentioned connection includes a pair of L-shaped flanges which are integral with the basket and project downwardly from the side walls, which flanges are received in undercut grooves formed in opposite sides of the pedestal adjacent the upper edges thereof. The flanges and grooves converge toward the front end of the cart to permit a precise but secure connection of the basket to the base in a desired aligned relationship. One or more of the plastics components of the cart are preferably molded so as to have a foamed interior structure enclosed within a hard and smooth exterior shell.

DETAILED DESCRIPTION

Figure 2:
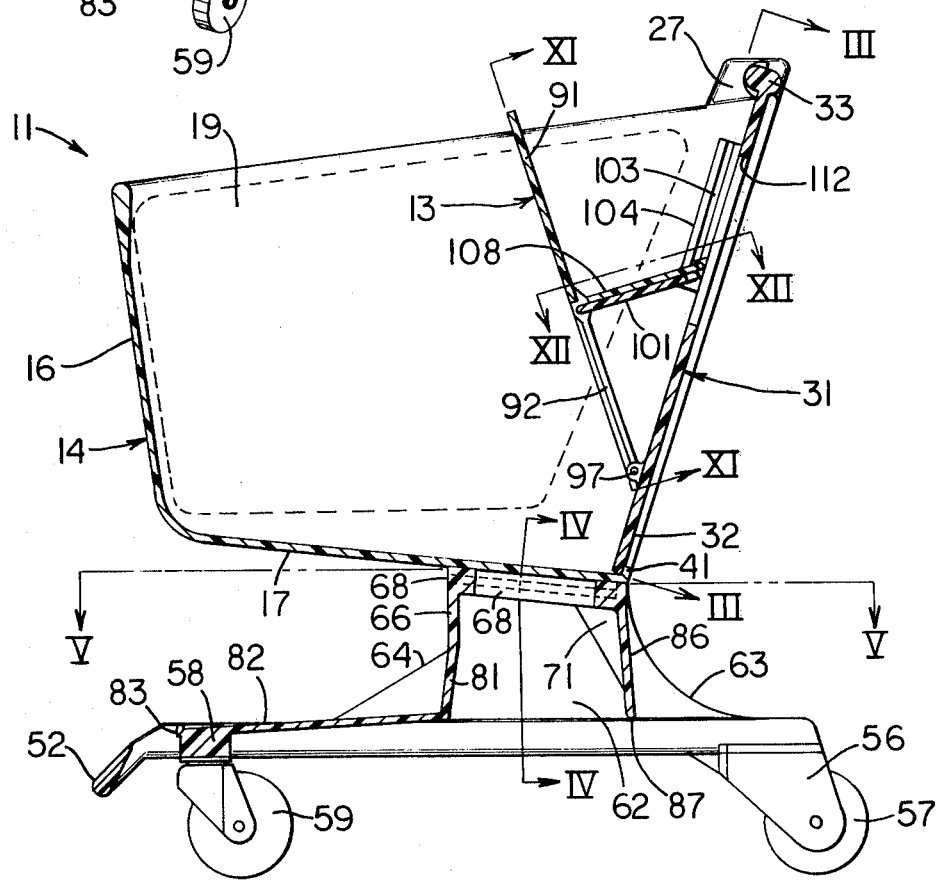
FIG. 2 is a side elevational view, in cross section, of the cart.

FIGS. 1 and 2 illustrate a shopping cart 10 constructed substantially entirely of plastics material, and formed specifically from a small number of molded plastics components. The cart 10 includes a basket assembly 11 supported on a wheeled base assembly 12. A collapsible baby seat assembly 13 is associated with the basket assembly 11.

Considering first the basket assembly 11 (FIGS. 1 and 2), same is formed primarily by a basket member 14 which is molded in one piece of a plastics material, preferably a foamed plastics material. The basket member 14 defines the front wall 16, the bottom wall 17 and the opposed side walls 18 and 19. Each of these walls includes a central wall portion 21 which is of a planar sheetlike construction of minimum thickness. The upper edges of the side and front walls are provided with suitable strengthening rails 22 extending therealong, and similar strengthening rails 23 integrally join the adjacent vertical edges of the front and side walls. A further strengthening rail 24 extends along the lower edge of the front wall.

The lower edges of the side walls 18 and 19 have enlarged strengthening rails 26 extending therealong, which rails are of decreasing vertical cross-section as they project from the rear toward the front of the basket assembly. Upwardly extending posts 27 are formed along the rear edges of the side walls, which posts project upwardly from the rails 26 and extend upwardly a small distance above the upper edges of the side walls.

Figure 4:
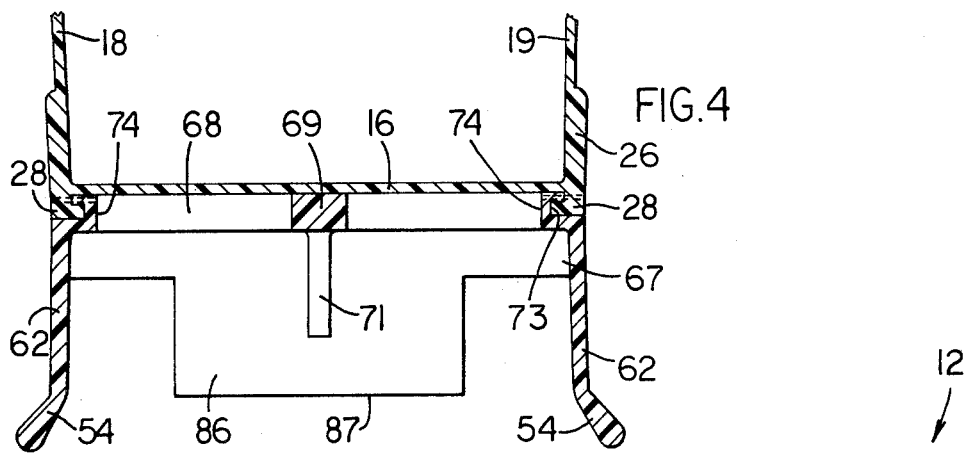
FIG. 4 is an enlarged, fragmentary sectional view along line IV—IV in FIG. 2.

The bottom support rail 26 associated with each side wall 18 and 19 has a downwardly projecting flange 28 integrally formed therewith, which flange is of a substantially L-shaped cross-section and extends throughout only a portion of the length of the side wall adjacent the rearward end thereof. The flanges 28, as illustrated in FIGS. 1 and 4, are substantially flush with and project downwardly from the support rails 26.

The basket member 14, including the front, bottom and side walls, and including also the above-mentioned rails, posts and flanges, is integrally molded as a one-piece plastics member and defines therein an upwardly opening storage compartment 29. However, the rear of the basket member 14 is substantially open.

Figure 6:
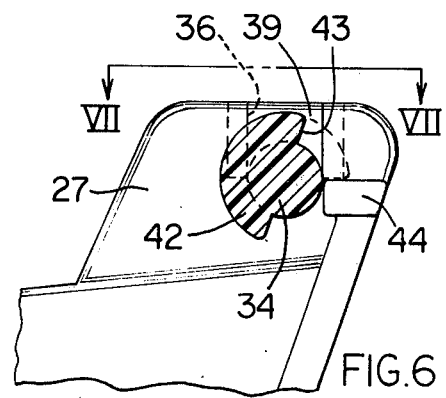
FIG. 6 is an enlarged, fragmentary sectional view as taken along the line VI—VI in FIG. 3.
Figure 7:
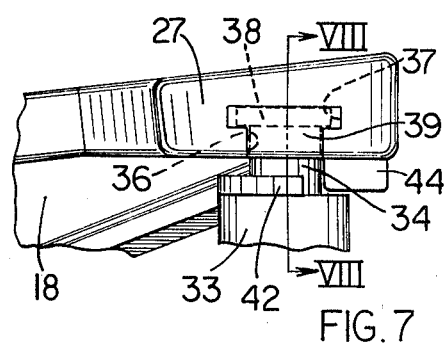
FIG. 7 is a fragmentary view taken along the line VII—VII in FIG. 6.

To close the rear of the basket member 14, the basket assembly 11 is provided with a rear wall or gate 31 which is preferably of a one-piece molded plastics construction and includes a substantially planar platelike wall portion 32 having an elongated rodlike handle 33 extending along the upper edge thereof. The handle 33 is, in the illustrated embodiment, of an egg-shaped cross-section and is of a length so that it extends across the basket member between the side walls thereof. The handle 33 has cylindrical bearing portions 34 (FIGS. 6 and 7) projecting outwardly from the opposite ends thereof, which bearing portions 34 are rotatably received within recesses 36 formed in the upper portions of the posts 27. The recesses 36 extend downwardly from the upper ends of the posts 27 and, when viewed in horizontal cross-section, have a substantially T-shaped configuration so that the recesses open outwardly through the inner wall of the respective posts. Each recess 36 has an enlarged portion 37 at the inner end thereof, which portion 37 accommodates therein an enlarged cylindrical disk 38 integrally formed on the free end of the cylindrical bearing portion 34. The disks 38, by being retained in the recess portions 37 as formed in the posts 27, thus structurally connects the posts 27 together to thereby provide the basket member 14 with substantial structural strength.

The lower end of the recess 36 is provided with a substantially semicylindrical wall which rotatably supports the cylindrical portion 34, whereby the handle 33 and the wall portion 32 integrally fixed thereto are pivotally supported on the posts 26. A molded plastic cap 39 is inserted into the upper end of each recess 36, which cap closes the recess and has a concave semicylindrical surface thereon for rotatably engaging the upper side of the cylindrical bearing portion 34. The cap 39 is fixedly secured to the post 26, as by an adhesive.

The wall portion 32 of the gate 31 is sized to substantially close the rear opening of the basket 14, in which position the lower edge of the gate engages a stop flange 41 (FIG. 2) integrally connected to and projecting upwardly from the rear edge of the bottom wall 17.

Handle 33 is also provided with a semicylinder stop 42 (FIGS. 6 and 7) adjacent the opposite ends thereof. The stops 42 are positioned directly adjacent the inside surfaces of the posts 27. The posts 27 also have lugs 44 integrally molded thereon and projecting outwardly therefrom, which lugs 44 are adapted to be contacted by the surfaces 43 on the stops 42 when the gate 31 is swung upwardly during nesting of a plurality of carts. This coaction between the stops 42 and lugs 44 permits the gate to swing upwardly through an angle which approaches 90°.

As conventional with shopping carts, the basket assembly 11 has the bottom wall 17 disposed so as to slope upwardly relative to the horizontal as it projects toward the front end thereof. The opposite side walls 18 and 19 also converge as they project toward the front end of the basket, which side walls 18 and 19 additionally converge as they extend downwardly to the bottom wall. This configuration permits proper nesting of one basket within a similar basket when the carts are disposed in a nested relationship as illustrated in FIG. 13.

The L-shaped flanges 28 are also inclined relative to one another in a relationship similar to side walls, and the advantages of this inclination will be explained hereinafter.

Considering now the wheeled base assembly 12, same is formed primarily by a base 49 which is preferably formed as a one-piece molded plastics member. The base 49 includes a substantially U-shaped support 51 which is defined by a front rail 52 and opposed side rails 53 and 54. The rearward ends of the side rails 53 and 54 each have a boxlike shroud 56 integrally attached thereto, which shroud opens downwardly so as to accommodate therein a cylindrical roller or wheel 57. The forward ends of the side rails 53 and 54 are joined by a cross rail 58 (FIG. 2) which is integrally molded with the base 49 and extends parallel to but spaced rearwardly from the front rail 52. The cross rail 58 has a pair of conventional swivel casters 59 mounted thereon.

The base 49 also includes a boxlike pedestal 61 which is integrally connected to and projects upwardly from the U-shaped support 51. The pedestal 61 is defined by a pair of opposed side plates 62 (FIG. 4) which project upwardly from the side rails and are joined thereto by a rear portion defined by a curved profile 63 and a front portion defined by the tapered profile 64. The side plates 62 are inclined relative to one another in the forward direction of the base, and the side rails 53 and 54 likewise slope inwardly relative to one another to facilitate the nesting of similar base assemblies one within another.

The side plates 62 are joined by transversely extending front and back plates 66 and 67, respectively. The side, front and back plates 62, 66 and 67 have an enlargement formed at the upper end thereof, which enlargement defines a substantially rectangular flange or rim 68. The rectangular flange 68 is normally open in the center thereof, and a suitable reinforcing bar 69 (FIG. 4) can be molded to extend thereacross to thereby strengthen the pedestal. A further reinforcing rib 71 is preferably molded into the pedestal so as to extend downwardly from the center reinforcing bar 69 to the back plate 67.

Figure 5:
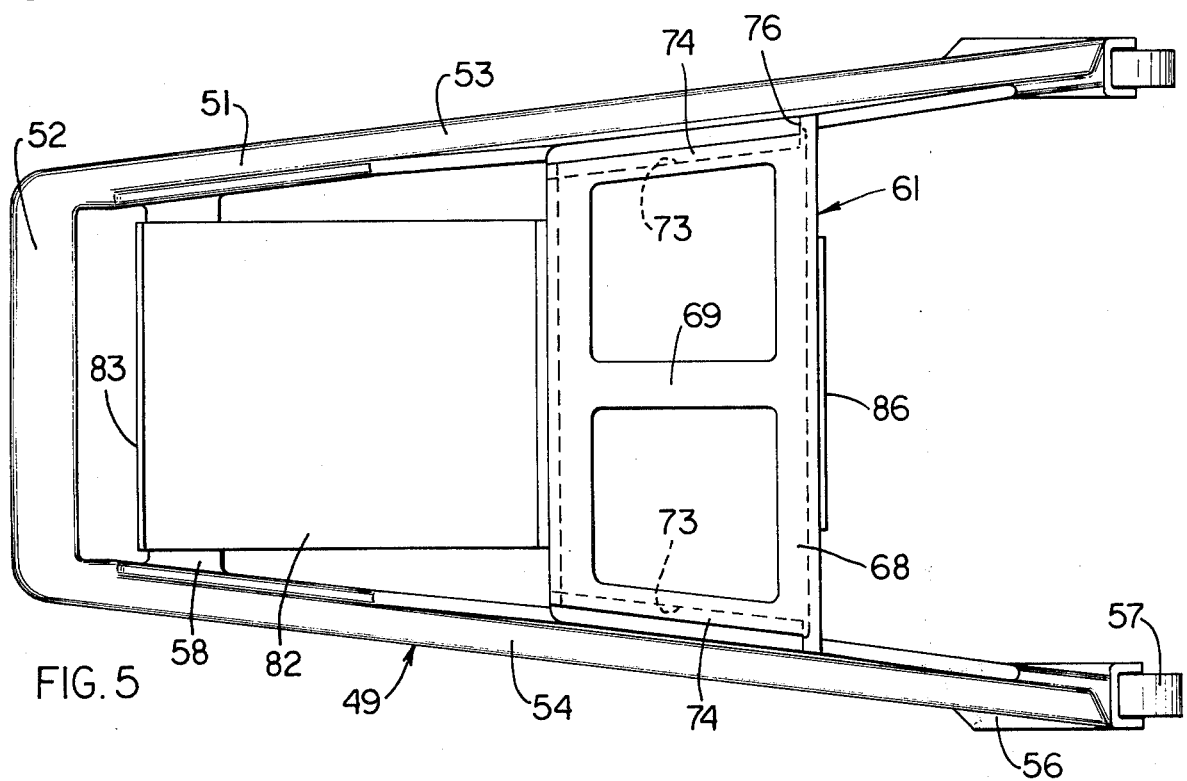
FIG. 5 is a top view of the base with the basket removed, as taken substantially along the line V—V in FIG. 2.

Pedestal 61 has a pair of undercut grooves 73 (FIG. 4) formed in the upper end thereof, which grooves 73 are formed in and extend along the opposite sides of the flange 68 adjacent the side walls 62. The undercut grooves 73 result in the formation of L-shaped rails 74 which extend along the opposite upper edges of the pedestal. The rails 74, and the associated undercut grooves 73, are of a size to snugly accommodate therein the L-shaped flanges 28. However, the rearward end of each groove 73 terminates at a stop surface 76 (FIG. 5). The angular relationship between the grooves 73 and the corresponding angular relationship of the flanges 28, in conjunction with the stop surfaces 76, permits the basket 14 to be easily mounted on the pedestal 61. This angular relationship also results in a wedge-type engagement between the flanges and grooves which is not only strong and tight but also provides a precise and accurate positioning and alignment of the basket on the pedestal.

The basket 14 is preferably fixedly connected to the base by screws 77 (FIG. 1) which extend through the flanges 28 into the top flange 68 of the base pedestal 61.

The base member 49 additionally includes a depending plate portion 81 which is integrally molded to and projects downwardly from the lower edge of the front pedestal plate 66. The plate portion 81 has the lower end thereof integrally connected to the rearward end of a planar support plate 82, which plate 82 projects forwardly between the side rails 53 and 54 and has the front portion thereof integrally molded to the cross rail 58. The forward edge of support plate 82 is preferably provided with a small upwardly projecting lip 83 thereon. The plate 82 extends substantially across the width of the base to thereby form a substantially enlarged planar surface which can be used as an auxiliary article support surface. This plate 82 slopes downwardly at a slight angle as it projects toward the front end of the cart, whereby the upper surface thereof functions as a camming surface to facilitate nesting of carts as explained hereinafter.

The back pedestal wall 67 also has a further plate portion 86 integrally molded thereto and projecting downwardly therefrom, which plate portion 86 functions as a lifting member when the carts are being nested. A rounded lower edge 87 is provided on the lifting member 86. The reinforcing rib 71 extends downwardly so as to provide additional support for the lifting plate 86, as illustrated in FIG. 4. The plate member 86, as shown in FIG. 4, has a width which is preferably slightly less than the width of the support plate 82 to facilitate the engagement of the rounded edge 87 on one cart with the support plate 82 on a further cart during nesting.

Considering now the baby seat assembly 13, and referring specifically to FIGS. 2, 3 and 9–11, same includes a platelike backrest 91 which has a pair of support arms 92 fixedly, here integrally, connected thereto and projecting downwardly therefrom. Arms 92 terminate in enlarged journal members 93 which are adapted to be positioned between a pair of hinged plates 94 molded integrally on the gate 31. Hinge plates 94 are separated by an opening 96 formed in the gate. A hinge pin 97 extends between the hinge plates 94 for pivotally supporting the journals 93.

Figure 10:
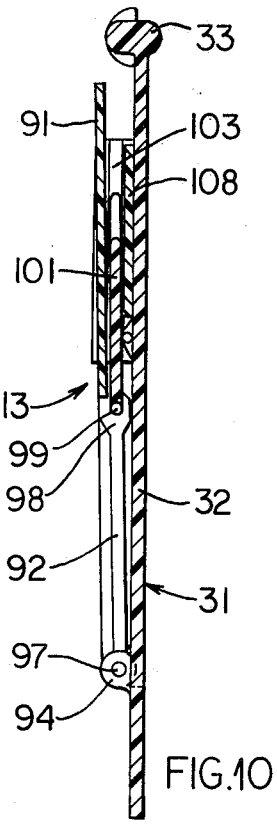
FIG. 10 is a view similar to FIG. 9 and showing the seat assembly in its closed or collapsed position.
Figure 11:
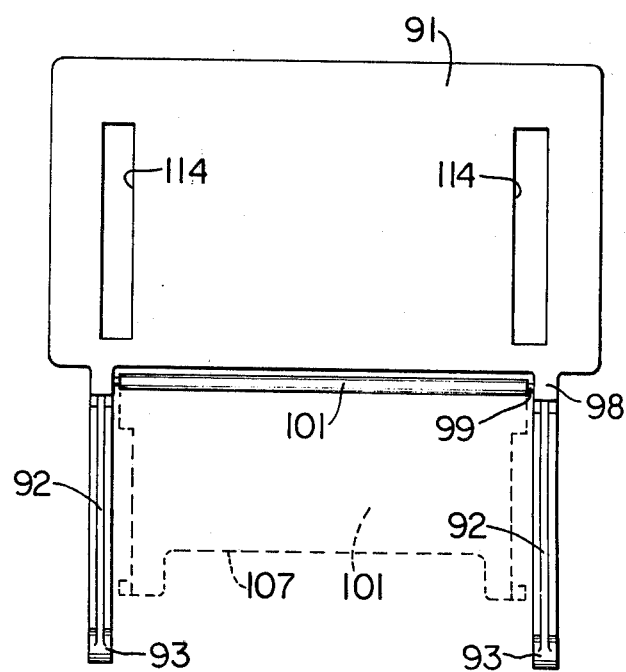
FIG. 11 is a view taken substantially along the line XI—XI in FIG. 2.

The arms 92, at their juncture with the backrest 91, are provided with enlargements 98 which function as journals for a pair of hinge pins 99, which pins project outwardly from the opposite sides of a planar seat portion 101 adjacent the rear edge thereof. The pivot axis defined by the pins 99 is transversely offset from the planar back portion 91 to permit the baby seat assembly to be folded into a collapsed position (as illustrated in FIG. 10) wherein the back portion 91 and the seat portion 101 substantially overlie one another.

Figure 12:
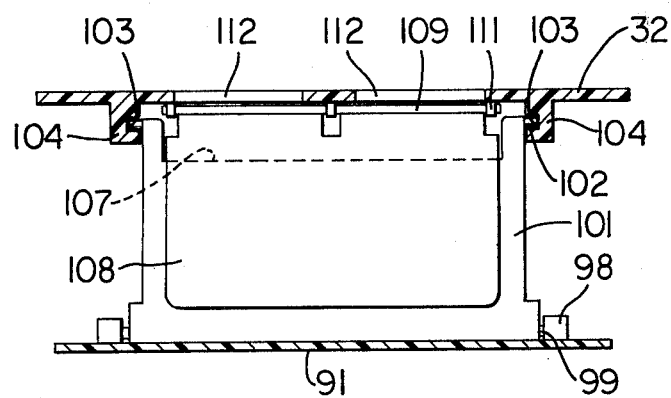
FIG. 12 is a fragmentary view taken along the line XII—XII in FIG. 2.

The seat portion 101 has a pair of slide pins 102 (FIG. 12) integrally formed thereon, which slide pins project outwardly from opposite sides of the seat portion adjacent the forward edge thereof. The pins 102 are slidably accommodated wihin elongated grooves 103 formed within rails 104 which are fixedly associated with the rear gate 31. The rails 104 are substantially parallel and extend vertically of the rear gate, and are integrally connected thereto as by being molded therewith. The grooves 103 extend in parallel relationship and open toward one another to thereby accommodate the seat portion 101 therebetween. The grooves 103 terminate short of the lower end of the rails 104 so as to define a stop 106 (FIG. 3) for limiting the downward movement of the pins 102 when the baby seat assembly is moved into its opened position as illustrated in FIG. 9. The seat portion 101 also has a recess 107 formed in the forward edge thereof, which recess 107 extends across a major portion of the width of the seat portion.

Figure 3:
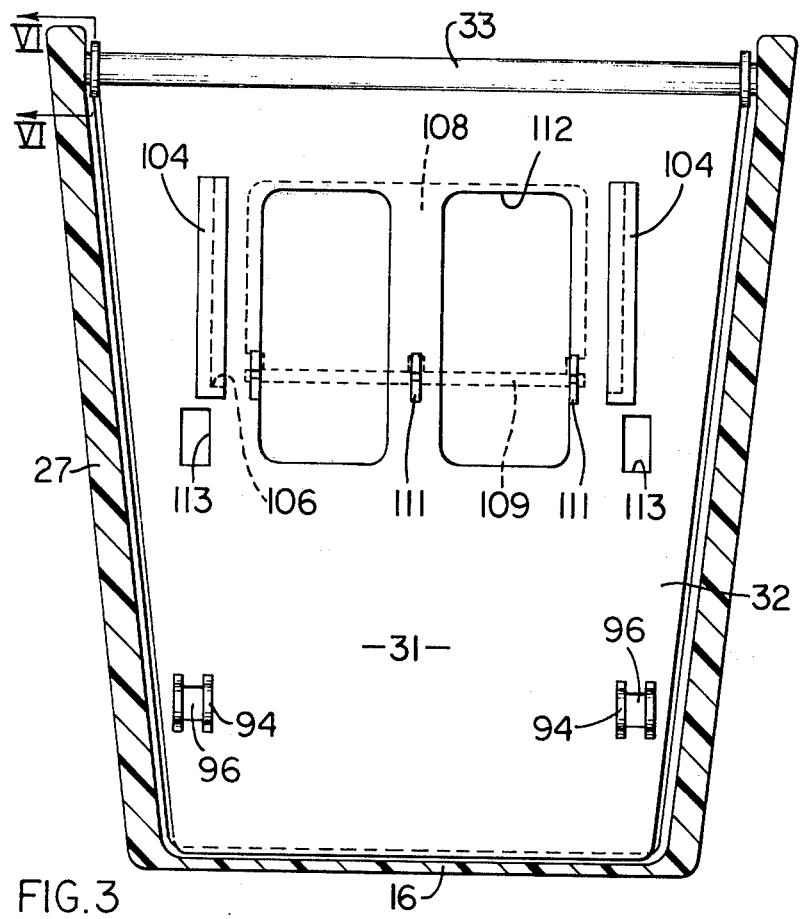
FIG. 3 is a fragmentary sectional view on an enlarged scale taken along the line III—III in FIG. 2.

In the illustrated embodiment, the baby seat assembly 13 additionally includes a planar seat plate 108 which, as illustrated by dotted lines in FIG. 3, has a hinge rod 109 associated therewith and extending along one edge thereof. This hinge rod 109 is adapted to be rotatably supported within suitable brackets 111 which are integrally molded on and project outwardly from the inner surface of the gate 31. The brackets 111 resiliently but rotatably retain the hinge rod 109 therein. The seat plate 108 has a width which is slightly less than the width of the recess 107 so that the plate 108 will extend through the recess 107 and overlap the seat portion 101 when the baby seat assembly is in its open position as illustrated in FIG. 9. On the other hand, the seat plate 108 will swing upwardly so as to lie substantially parallel with the gate 31, and thereby also lie substantially parallel with the seat portion 101, when the baby seat assembly is collapsed as illustrated in FIG. 10.

The gate 31 is provided with a pair of enlarged leg openings 112 therethrough. The leg openings 112 can be effectively closed by the seat plate 108, as illustrated by dotted lines in FIG. 3, when usage of the leg openings is not desired.

A further pair of openings 113 extends through the gate 31, which openings are substantially aligned with the enlargements 98 when the baby seat is collapsed to permit the enlargements 98 to partially extend into openings 113, if necessary, thereby permitting a complete collapsing of the baby seat as illustrated in FIG. 10.

The complete collapsing of the baby seat assembly is further facilitated by the provision of a pair of elongated and substantially parallel slots 114 which extend through the back portion 91. These slots 114 accommodate therein the rails 104 which project from the gate 31 when the baby seat is collapsed.

The baby seat assembly 13, and specifically the back portion 91, arms 92 and seat portion 101 are molded by means of a single molding operation so that the back portion 91 and seat portion 101 are thus removable from the mold in a preassembled condition. When so molded, the seat portion 101 is positioned between the arms 92 substantially as illustrated by dotted lines in FIG. 11, and the hinged connection provided between the pins 99 and the enlargements 98 is automatically formed during the molding process.

The particular plastics material utilized for the several components above described may be chosen as desired. The particular embodiment herein described was particularly designed for making from foamed plastics materials, but solid plastics materials may be used as desired.

OPERATION

While the utilization of the shopping cart according to the present invention is believed readily apparent from the above description, nevertheless same will be briefly reviewed to ensure a complete understanding thereof.

When the cart is to be utilized, and assuming that the baby seat assembly 13 is in its collapsed condition as illustrated in FIG. 10, then the user will grip the upper edge of the back portion 91 and push same away from the gate 31. This results in the back portion 91 swinging about the hinge pins 97, whereupon the pins 102 on the seat portion 101 slide downwardly along the grooves 103 so as to bear against the stops 106. The baby seat assembly can be used to permit positioning therein of fragile items, such as eggs, bread and the like. On the other hand, if the assembly 14 is to be used for supporting a child, then the seat plate 108 can be swung downwardly about the hinge rod 109 so as to overlap the seat portion 101, as illustrated in FIG. 9, thereby uncovering the openings 112 to permit the legs of the child to be inserted therethrough.

When the baby seat assembly 14 is to be collapsed, same is moved from the position of FIG. 9 into the position of FIG. 10 by a reverse sequence of the steps outlined above.

To facilitate nesting of a plurality of carts 10, the one cart 10, as illustrated in FIG. 13, is pushed into a further cart 10', whereupon the gate 31' as associated with the cart 10' swings upwardly in the presently known manner to permit the basket of the two carts to nest one within the other. The permissible nesting of the two carts is limited by the rear lifting plate 86' as associated with the front cart 10' engaging the front wall 81 of the rear cart 10. This relationship limits the nesting of one cart within the other to a position so that the gate 31' will rest on the front rail 22 of the rear cart, thereby preventing the gate 31' and baby seat assembly 13' as associated with the front cart 10' from falling into the basket associated with the rear cart 10.

When the carts 10 and 10' are nested together, as illustrated in FIG. 3, the lower edge 87' of the lift plate 86' on the front cart 10' engages the sloped support plate 82 of the rear cart 10, thereby causing the rear wheels 57' of the front cart 10' to be lifted upwardly out of engagement of the ground, thereby facilitating the steering and the manual manipulation of a plurality of nested carts.

While the shopping cart of the present invention preferably utilizes both a plastics basket assembly 11 and a plastics base assembly 12, nevertheless some but not all of the objectives of the invention could be accomplished if the plastics basket assembly 11 were mounted on a metal base assembly.

Although particular preferred embodiments of the invention have been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. In a basket having a collapsible baby seat assembly mounted on one wall thereof, comprising the improvement wherein:
    said one wall of said basket has a pair of substantially vertically extending rails fixedly mounted thereon and disposed in spaced parallel relationship, said one wall being molded in one piece of a plastics material and said rails being an integral molded part of said one wall, said pair of rails defining a pair of grooves which extend longitudinally of the rails and open in opposite relationship to one another, said rails also having stop means associated therewith for effectively closing off the lower ends of said grooves;
    said baby seat assembly including a backrest member hingedly mounted on said one wall, said backrest member being molded in one piece of a plastics material and including a substantially planar platelike back portion and a pair of substantially parallel support arms fixed to one edge of said back portion and projecting downwardly therefrom substantially within the plane defined by said back portion, said arms having the lower free ends thereof hingedly connected to said one wall in the vicinity of the lower edge thereof; and
    said baby seat assembly also including a substantially planar seat member hingedly connected adjacent one edge thereof to said backrest member in the vicinity of the junction between the back portion and the support arms, said seat member also being molded in one piece of a plastics material and including a pair of guide means which project into and are slidably and rotatably received within the grooves formed in said rails.

2. A basket according to claim 1, wherein said one wall has a pair of adjacent and vertically elongated openings formed therein for permitting the legs of a child to be inserted therethrough when seated on the opened baby seat assembly, and said back portion having a pair of substantially parallel and spaced slots formed therein and extending therethrough, said slots accommodating therein said rails when said baby seat assembly is collapsed so as to overlie said one wall.

3. A basket according to claim 1, wherein said baby seat assembly includes a further platelike seat part adapted to overlie said seat member when said baby seat assembly is in its opened position, said one wall having a plurality of resilient bearing supports integrally molded thereon, and said seat part having a rodlike hinge part fixedly associated therewith and projecting along one edge thereof, said rodlike hinge part being resiliently retained by the bearing supports so that said seat part can be swingably moved between its collapsed position wherein it overlaps said one wall when the baby seat assembly is closed, and an open position wherein it overlies the seat member when the baby seat assembly is opened.

4. A basket according to claim 1, wherein said rails are each of a substantially L-shaped cross-section and project inwardly into the basket from the inner surface of said one wall, said seat member having a pair of hinge pins integrally molded thereon and projecting outwardly from opposite edges of said seat member for hingedly connecting said seat member to said backrest member, said seat member also having a further pair of pins integrally molded thereon and positioned adjacent the other edge thereof, said latter-mentioned pins projecting in opposite directions and being slidably and rotatably accommodated within the grooves formed in said L-shaped rails.

5. A basket according to claim 1, wherein said basket includes a one-piece basket member molded of a plastics material, said basket member having a pair of side walls joined together by a bottom wall and at least one end wall, the basket including a swingable gate of plastics material associated with the other end of the basket member, said swingable gate comprising said one wall.

6. In a shopping cart having a wheeled base assembly and a basket assembly mounted on said base assembly, comprising the improvement wherein said base assembly includes a one-piece plastics base having a pair of spaced-apart elongated rails extending between the front and rear ends of said base assembly, said base assembly including a pair of wheel assemblies mounted on said rails adjacent the forward end of said base assembly and a further pair of wheel assemblies mounted on said rails adjacent the rear of said base assembly, said one-piece plastics base also including pedestal means fixed to said rails and projecting upwardly therefrom with said pedestal means having the upper end thereof connected to said basket assembly, said pedestal means comprising an upright means which is disposed between the rails and projects upwardly therefrom, and means forming a tongue-and-groove connection between the upper portion of said pedestal means and the lower portion of said basket assembly for fixedly connecting said basket assembly to said base.

7. A cart according to claim 6, wherein the means forming the tongue-and-groove connection between the basket assembly and the pedestal means includes a pair of substantially horizontally elongated grooves formed in one of said upright means and basket assembly, and a pair of substantially horizontally elongated flanges fixedly associated with the other of said upright means and basket assembly, said flanges projecting in opposite directions relative to one another, and said grooves opening outwardly in opposite directions relative to one another for snugly accommodating therein said flanges, said pair of flanges and said pair of grooves each converging relative to one another in the longitudinal direction of said base assembly as said flanges and grooves project toward the front end of said base assembly.

8. A cart according to claim 7, wherein said basket assembly includes a pair of opposed side walls, said flanges being fixed to and projecting downwardly from the lower edges of said side walls, said flanges being of a substantially L-shaped configuration, and said grooves being formed in the opposite sides of said upright means adjacent the upper end thereof, the individual grooves opening outwardly and sidewardly with respect to the upright means, and stop means associated with the upright means for effectively closing the rearward end of said grooves.

9. A cart according to claim 8, wherein said basket assembly includes a one-piece plastics basket having a bottom wall, a front wall and said opposed side walls all integrally connected together.

10. A cart according to claim 6, wherein said basket assembly includes a one-piece plastics basket having front, bottom and opposed side walls all integrally and fixedly connected together, said basket being fixedly mounted on said base so that said bottom wall is adjacent the upper end of said upright means, and said means defining the tongue-and-groove connection including groove means formed in one of said means and basket and a projecting tongue integrally connected to the other of said upright tubular member and basket.

11. In a shopping cart having a wheeled base assembly and a basket assembly mounted on said base assembly, comprising the improvement wherein said base assembly includes a one-piece plastics base having rail means associated therewith, said base assembly including a pair of wheel assemblies mounted on said rail means adjacent the forward end of said base assembly and a further pair of wheel assemblies mounted on said rail means adjacent the rear of said base assembly, said one-piece plastics base also including pedestal means fixed to said rail means and projecting upwardly therefrom with said pedestal means having the upper end thereof connected to said basket assembly, said one-piece plastics base also including an enlarged article supporting plate projecting forwardly from said pedestal means and spaced downwardly a substantial distance below said basket assembly, said article supporting plate extending across a major portion of the width of said base assembly and being disposed substantially within a horizontal plane, said supporting plate sloping slightly downwardly as it projects toward the forward end of said base assembly, said pedestal means comprising an upright tubular pedestal member having a front wall portion adjacent the lower end thereof integrally connected to the rearward edge of said article supporting plate, and said one-piece plastics base having a downwardly projecting flange disposed adjacent the rear side of said pedestal member in the vicinity of the lower end thereof, said downwardly projecting flange extending across a substantial portion of the width of said base assembly and being adapted to cammingly engage the article supporting plate of a further cart during nesting of said carts thereby lift the rear wheel assemblies of one cart relative to said further cart.

12. A cart according to claim 11, wherein said rail means includes a substantially U-shaped rail having a front rail extending transversely across the front of said base assembly and a pair of side rails extending rearwardly from opposite ends of the front rail, the side rails diverging relative to one another as they project rearwardly, said pedestal means extending between and being integrally connected to the side rails at a location spaced between the front and rear ends thereof, and said supporting plate being disposed within and substantially totally occupying the space defined between the front rail, the pedestal means and the side rails.

13. A shopping cart, comprising in combination:

a wheeled base assembly comprising a one-piece plastics base having a plurality of wheel assemblies mounted thereon, said one-piece plastics base including an upwardly projecting pedestal portion;

a basket assembly fixedly attached to the pedestal portion of said base adjacent the upper end thereof, said basket assembly including a one-piece plastics basket having a bottom wall, a front wall and a pair of side walls, said walls all being integrally connected together;

said basket assembly also including a one-piece plastics gate swingably mounted on said basket for closing the rearward end thereof, said gate extending between the side walls and projecting upwardly from the bottom wall to a location adjacent the upper edges of said side walls, said gate having the opposite edges thereof hingedly connected to said side walls adjacent the upper rearward corners thereof;

a collapsible baby seat assembly movably supported on said gate and positioned within said basket, said baby seat assembly having a one-piece plastics backrest member defined by a substantially planar back portion adjacent the upper end of said backrest member and a pair of elongated support arms projecting downwardly from said back portion, said support arms having the lower ends thereof hingedly connected to said gate, said baby seat assembly also including a one-piece plastics planar seat member which is hingedly connected along one edge thereof to said backrest member adjacent the lower edge of said back portion;

said gate having a pair of elongated L-shaped rails integrally connected thereto and projecting in substantially parallel and vertical relationship therealong, said rails defining a pair of undercut grooves which open sidewardly in opposite directions; and said one-piece plastics seat member having a pair of projecting pinlike portions integrally formed thereon adjacent the other edge thereof, said projecting pinlike portions being slidably and rotatably received within said grooves, whereby the baby seat assembly can be moved between a collapsed position wherein the gate, seat member and backrest member overlie one another in substantially parallel relationship, and an open position wherein the backrest member extends at a substantial angle relative to the gate and the seat member extends substantially horizontally therebetween.

14. A cart according to claim 13, wherein said one-piece base includes an enlarged substantially rectangular support plate extending from a location adjacent the front side of said pedestal portion to a location adjacent the front end of said base assembly, said support plate extending across a majority of the width of said base assembly and being disposed substantially within a horizontal plane.

15. A cart according to claim 13, wherein said gate includes an elongated rodlike handle integrally and fixedly connected to and projecting along the upper edge thereof, said handle having pinlike bearing portions projecting outwardly from the opposite ends thereof, said pinlike bearing portions being rotatably received within and connected to the opposite side walls of said basket so that said gate and said handle are both pivotally supported with respect to said basket, said pinlike bearing portions and said side walls having cooperating projections formed thereon for fixedly interconnecting said handle and said side walls together in the axial direction of said handle to thereby securely interconnect the opposed side walls adjacent the upper rear corners thereof, said handle comprising the sole interconnection between said side walls adjacent the rear upper corners thereof.

16. In a nestable shopping cart having a wheeled base assembly and a basket assembly mounted on said base assembly, said basket assembly including a basket member fixedly connected to the base assembly and defining the bottom wall, the opposed side walls and one of the end walls of the basket assembly, the basket assembly also including a swingable gate assembly associated with the other end of said basket member, comprising the improvement wherein said basket member comprises a one-piece molded plastics body, said other end of said basket member being completely open, and wherein said gate assembly is formed by a one-piece gate unit formed as a one-piece molded plastics member and having an enlarged wall portion for substantially closing the other end of said basket member, said gate unit also including an elongated rodlike handle fixedly connected to and extending along said wall portion adjacent the upper edge thereof and hinge means associated with the opposite edges of said gate unit for hingedly supporting said gate unit on and between the side walls of said basket member, stop means fixed to the side wall of said basket member in the vicinity of said handle, and said handle having a stop device fixed thereon and coacting with said stop means for limiting the upward swinging movement of said gate unit during nesting of the cart.

17. In a nestable shopping cart having a wheeled base assembly and a basket assembly mounted on said base assembly, said basket assembly including a basket member fixedly connected to the base assembly and defining the bottom wall, the opposed side walls and one of the end walls of the basket assembly, the basket assembly also including a swingable gate assembly associated with the other end of said basket member, comprising the improvement wherein said basket member comprises a one-piece molded plastics body, said other end of said basket member being completely open, and wherein said gate assembly comprises a one-piece molded plastics gate unit having an enlarged wall portion for substantially closing the other end of said basket member, said gate unit also including an elongated rodlike handle integrally connected to and extending along said wall portion adjacent the upper edge thereof, said handle having pinlike bearing portions projecting outwardly from the opposite ends thereof, said pinlike bearing portions being rotatably received within and connected to the opposite side walls of said basket member so that said gate unit is pivotally supported with respect to said basket member, said pinlike bearing portions and said side walls having cooperating projections formed thereon for fixedly interconnecting said handle and said side walls together in the axial direction of said handle to thereby securely interconnect the opposed side walls adjacent the upper rear corners thereof, said handle comprising the sole interconnection between said side walls adjacent the rear upper corners thereof, and means forming a tongue-and-groove connection between the upper portion of the base assembly and the lower portion of said basket member for fixedly connecting said basket member to said base assembly.

18. In a shopping cart having a wheeled base assembly and an upwardly opening basket assembly fixedly mounted on said base assembly, comprising the improvement wherein said base assembly includes a one-piece plastics base having rail means associated therewith, said base assembly including a pair of wheel assemblies mounted on said rail means adjacent the forward end of said base assembly and a further pair of wheel assemblies mounted on said rail means adjacent the rearward end of said base assembly, said one-piece plastics base also including pedestal means fixed to said rail means and projecting upwardly therefrom, said pedestal means being spaced inwardly from the frontward and rearward ends of said base assembly, and means forming a tongue-and-groove connection between the upper portion of said pedestal means and the lower portion of said basket assembly for fixedly connecting said basket assembly to said base.

19. In a shopping cart having a wheeled base assembly and an upwardly opening basket assembly fixedly mounted on said base assembly, comprising the improvement wherein said base assembly includes:

a one-piece plastics base having rail means associated therewith, a pair of wheel assemblies mounted on said rail means adjacent the forward end of said base assembly, and a further pair of wheel assemblies mounted on said rail means adjacent the rearward end of said base assembly;

said one-piece plastics base including pedestal means fixed to said rail means and projecting upwardly therefrom, said pedestal means being spaced inwardly from the frontward and rearward ends of said base assembly and having the upper end thereof connected to said basket assembly;

said one-piece plastics base also including an enlarged article supporting plate projecting forwardly from said pedestal means and spaced downwardly a substantial distance below said basket assembly, said article supporting plate extending across a major portion of the width of said base assembly and being disposed substantially within a horizontal plane, said supporting plate sloping slightly downwardly at its projects toward the forward end of said base assembly; and said plastics base further having a downwardly projecting flange disposed adjacent the rearward side of said pedestal means, said flange extending across a portion of the width of said base assembly and being adapted to cammingly engage the article supporting plate of a further cart during nesting of said carts to lift the rear wheel assemblies of one cart relative to said further cart.

* * * * *

UNITED STATES PATENT AND TRADEMARK OFFICE
CERTIFICATE OF CORRECTION

PATENT NO. : 4 046 394

DATED : September 6, 1977

INVENTOR(S) : William A. Thompson, Jr.

It is certified that error appears in the above-identified patent and that said Letters Patent are hereby corrected as shown below:

Column 12, line 19; after "said" insert ---upright---.

Column 12, line 21; change "tubular member" to ---means---.

Column 12, line 48; change "rear" to ---rearward---.

Column 12, line 54; after "carts" insert ---to---.

Signed and Sealed this

Third Day of January 1978

[SEAL]

Attest:

RUTH C. MASON
Attesting Officer

LUTRELLE F. PARKER
Acting Commissioner of Patents and Trademarks